Mar. 27, 1923.

C. W. BUCK

SPEED CONTROLLING VALVE

Filed July 11, 1922     2 sheets-sheet 1

1,449,583

Witnesses:
F. L. Fox.
H. Berman

Inventor
C. W. Buck.
By Clarence A. O'Brien
Attorney

Mar. 27, 1923.
C. W. BUCK
1,449,583
SPEED CONTROLLING VALVE
Filed July 11, 1922   2 sheets-sheet 2
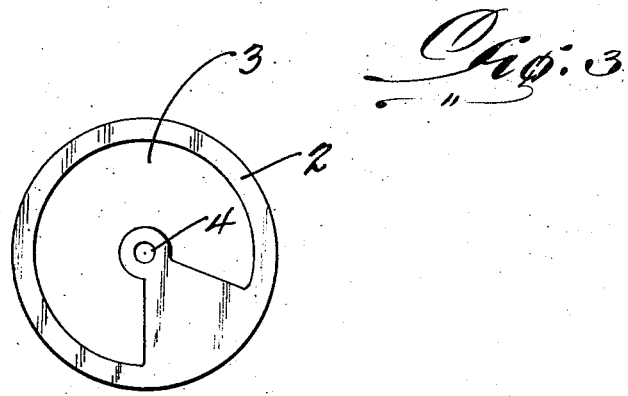
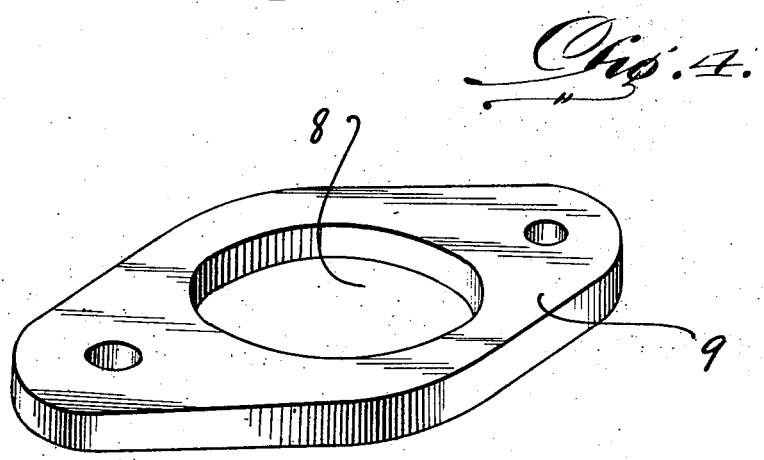
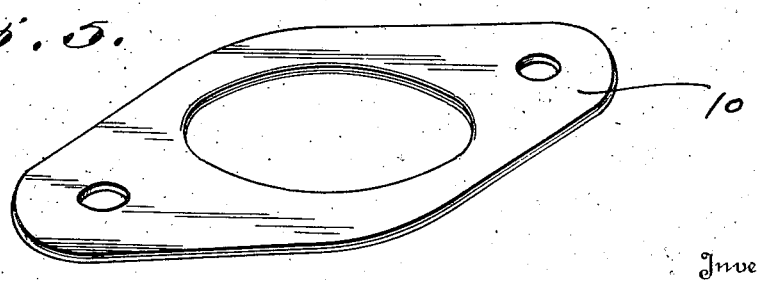

Patented Mar. 27, 1923.

1,449,583

UNITED STATES PATENT OFFICE.

CLAUDE W. BUCK, OF LA CROSSE, INDIANA.

SPEED-CONTROLLING VALVE.

Application filed July 11, 1922. Serial No. 574,209.

*To all whom it may concern:*

Be it known that I, CLAUDE W. BUCK, a citizen of the United States, residing at La Crosse, in the county of Laporte and State of Indiana, have invented new and useful Improvements in Speed-Controlling Valves, of which the following is a specification.

In carrying out the present invention it is my purpose to provide a speed controlling valve for internal combustion engines of motor vehicles which may be inserted in the connection between the manifold and the carburetor, so as to limit the supply of the vaporized mixture to the engine cylinders, thereby preventing more than a predetermined amount of the volatile mixture flowing to the engine cylinders, irrespective of the throttle valve which is under the control of the driver of the vehicle.

It is also my purpose to provide a speed controlling valve of the class described which may be set manually to reciprocate or enlarge the passage through which the volatile mixture flows and which, when set and installed, may be sealed in place, so that tampering with the valve by unauthorized persons may be detected.

A further object of my invention is to provide a speed controlling valve for motor vehicles which will embrace the desired features of simplicity, efficiency and durability, which may be manufactured and installed at minimum expense, which will operate effectively under all conditions and which will embody comparatively few parts and will be so arranged and correlated as to reduce the possibility of derangement to a minimum.

With the above recited objects in view, and others of a like nature, the invention resides in the construction, combination and arrangement of parts set forth in and falling within the scope of the appended claim.

In the accompanying drawings:

Figure 3 is a perspective view of one of the disks of the valve.

Figure 4 is a perspective view of the plate carrying the valve.

Figure 5 is a perspective view of one of the gaskets employed to effect a fluid tight joint.

Figure 1:
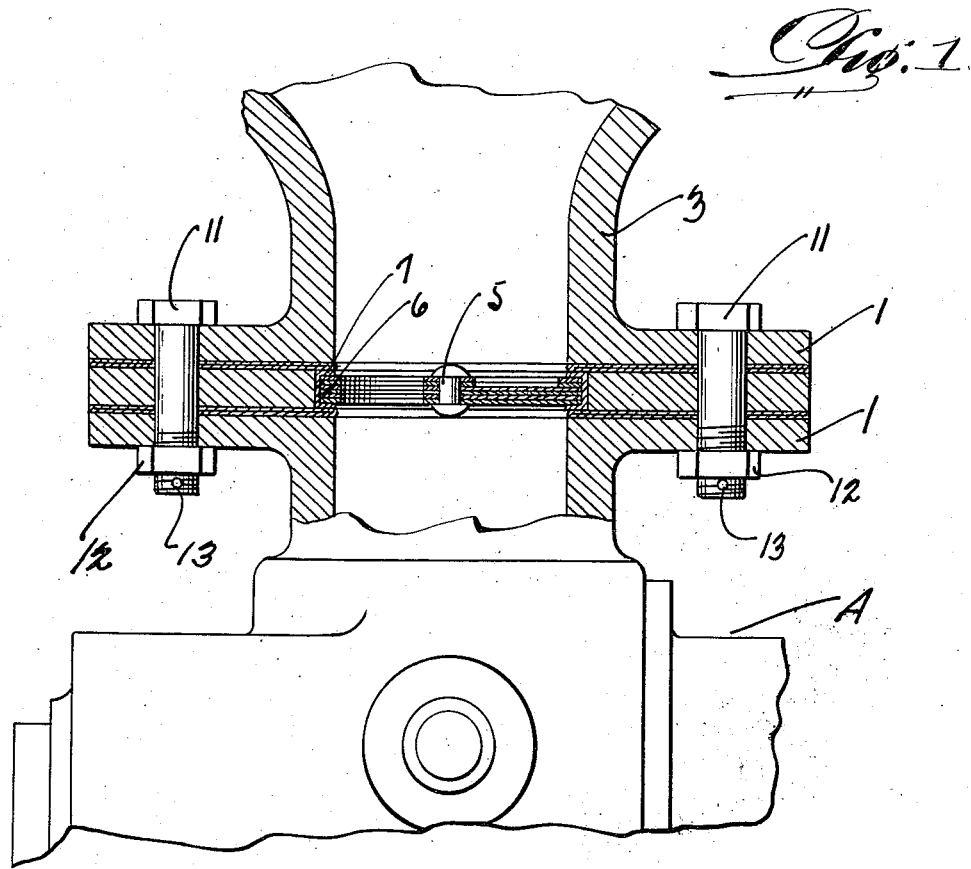
Figure 1 is a cross sectional view through my improved valve showing the same installed in the connection between the carburetor and the manifold.
Figure 2:
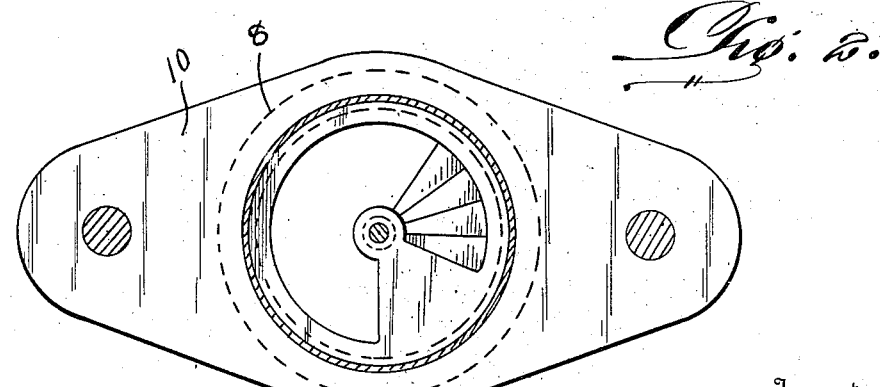
Figure 2 is a horizontal sectional view showing my valve in top plan.

Referring now to the drawings in detail, A designates a portion of a carburetor of any suitable or preferred construction, while 3 indicates the lower end of the intake manifold to which the carburetor is connected. The lower end of the manifold and the upper end of the carburetor are equipped with outwardly extending flanges 1—1, respectively, that are formed with alining bolt holes by which the carburetor may be bolted to the manifold.

Interposed between the carburetor and the manifold is my improved speed regulating valve. In the present instance this valve comprises a plurality of circular disks 2, each of which is cut out for the major portion of its area in the form of a segment-shaped slot 3 and provided with a hub 4 at the center that is integral with the remaining portion of the disk that is contiguous to the segment shaped slot, as clearly illustrated in Figure 3 of the drawings. These disks are arranged one upon the other in face to face contact, as shown in Figure 1, and passed through the alining openings in the hubs 4 is a rivet 5 or other fastening device. By means of this construction it will be seen that the disks may be rotated relatively to one another, so as to vary the area of the opening provided by the segment-like slots, the portions of the disks contiguous to the slots being arranged fan-like in the relative adjustment of the disks to change the size of the passage. In the present instance these disks are encased in a jacket 6, the edges of which are spun or flanged inwardly, as at 7, to hold the disks in proper relative positions for circular movement to effect the changing of the size of the passage provided by the disks. This jacket is fitted into an opening 8 formed in a holder 9 centrally of such holder. The holder 9 is of a shape corresponding to the shape of the securing flanges on the ends of the carburetor and the intake manifold and is formed with bolt holes that aline with the similar holes in the flanges 1. Interposed between the confronting faces of the flanges 1—1 and the holder 9 are gaskets 10 formed of copper or any other material, and passed through the alining bolt holes and the gaskets are securing bolts 11 equipped with nuts 12 and formed with cross bores 13 respectively below the nuts, so that a wire may be passed through the cross bores below the nuts and seals attached to the wires, in order that tampering with the valve by unauthorized persons may be detected.

In practice, the holder carrying the valve disks is inserted in the connection between the carburetor and the intake manifold, as clearly illustrated in Figure 1 of the drawings. Prior to the insertion of the valve in this connection the disks are adjusted relatively to each other to provide a passage for the gas of the required area, and after the valve has been fastened in position and sealed, then the volume of gas passing through the manifold is limited, irrespective of whether the throttle valve is partially open or wide open. Thus, a limit is set upon the quantity of gas that may be delivered to the motor, so that the driver of the vehicle is prohibited from operating such vehicle beyond a predetermined speed.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed as new, is:—

A speed controlling valve comprising a plurality of circular disks placed in face to face contact and formed respectively with openings, a pivot pin connecting said disks to each other at the center, so that the disks may be rotated relatively to one another to vary the size of the passage formed by said opening, a circular jacket encasing said disks at the periphery thereof and having the edges flanged inwardly to hold the disks in proper relative positions and a holder formed with an opening into which said jacket is fitted.

In testimony whereof I affix my signature.

CLAUDE W BUCK.